March 26, 1963 A. M. SWANSON ET AL 3,083,099
AGGLOMERATION PROCESS
Filed Aug. 24, 1959
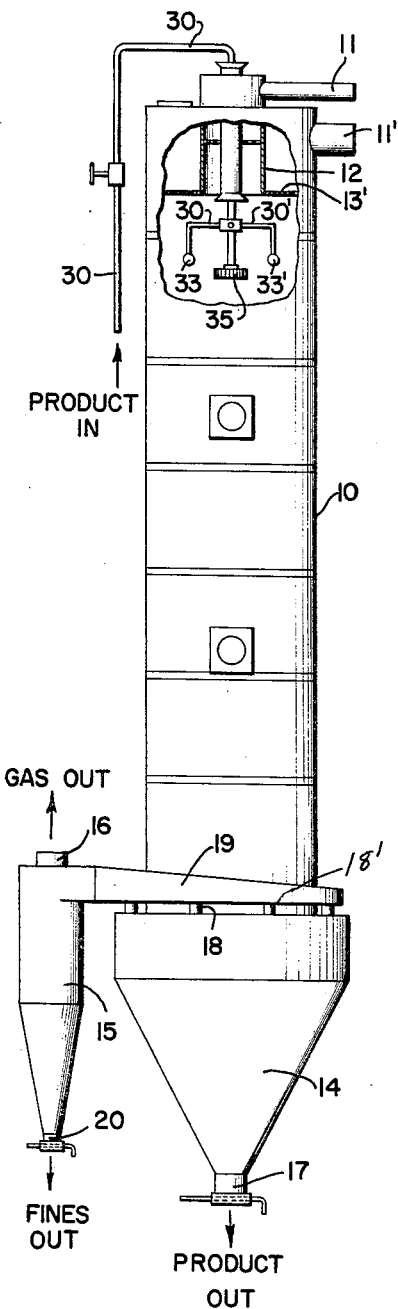
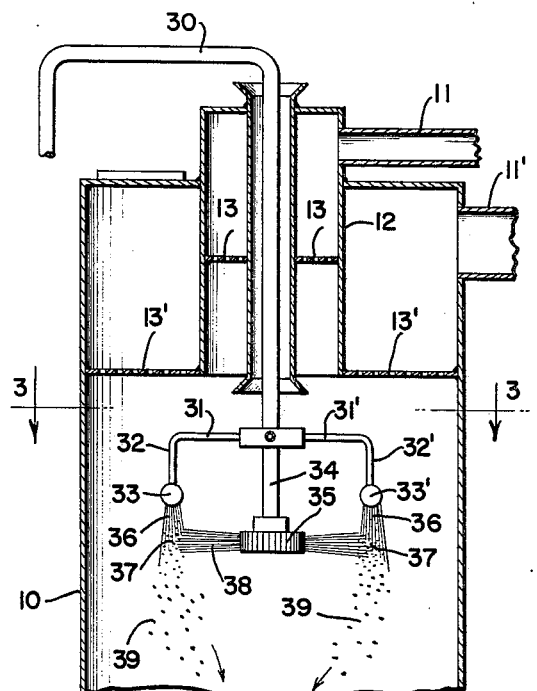
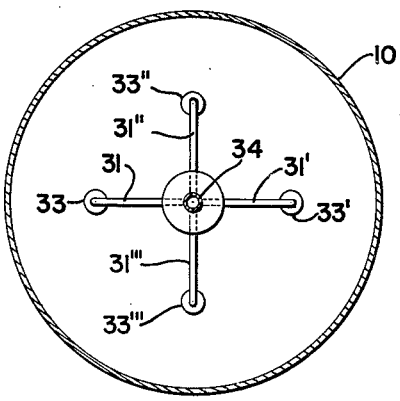
INVENTORS
ARTHUR M. SWANSON
CLYDE H. AMUNDSON
BY *Adams, Forward & McLean*
ATTORNEYS United States Patent Office 3,083,099
Patented Mar. 26, 1963

3,083,099
AGGLOMERATION PROCESS
Arthur M. Swanson and Clyde H. Amundson, Madison, Wis., assignors to Wisconsin Alumni Research Foundation, Madison, Wis., a corporation of Wisconsin
Filed Aug. 24, 1959, Ser. No. 835,756
1 Claim. (Cl. 99—56)

The present invention relates to an improved process for the manufacture of dry powdered products in porous aggregate or agglomerate form from liquid concentrates having solid material dissolved or dispersed therein and especially from liquid products such as liquid lacteal material like skim milk.

It is well known that conventional skim milk powder produced by spray drying of skim milk without further treatment, has been relatively difficult to disperse in water when it is desired, for example, to reconstitute the dry powder into a liquid product. See Peebles Patent No. 2,835,586 and Louder et al. Patent No. 2,832,686. This is due primarily to the fact that the conventional skim milk powder has poor wettability and self-dispersion in that the powder tends to float on the water and form sticky masses or lumps. In view of these characteristics, many attempts have been made to improve the wettability of conventional skim milk powder as it was known that a dry milk powder with good wettability along with good solubility could be readily dispersed in water to form a stable homogeneous liquid product. The early attempts for the most part were directed to modifications in the drying operation itself including the use of different drying temperatures, etc. More recently the conversion of the conventional skim milk powder into loose porous aggregates or agglomerates has been proposed. See Peebles patent and Louder et al. patent, supra.

The skim milk product in porous aggregate or agglomerate form produced by the Peebles or Louder et al. patented processes has been demonstrated in commercial operations to be characterized by relatively high wettability and to be readily dispersible in water to form a stable reconstituted milk product. In this the Peebles and Louder et al. product represents a distinct improvement over conventional skim milk powders.

The Peebles and Louder et al. processes essentially call first for the preparation of conventional skim milk powder and then for the moistening of the dry powder milk particles with steam or atomized droplets of water, followed by the removal of excess water from the resulting aggregates or agglomerates. While the Peebles and Louder et al. product is a good one, as noted above, the special wetting and drying steps required to produce the porous aggregates or agglomerates have proven objectionable due to cost and particularly so as these added steps require special apparatus in which to carry them out. See in this connection the apparatus illustrated in FIGURE 3 of the above Peebles patent and FIGURE 1 or 2 of the above Louder et al. patent. A reduction or substantial elimination of the added labor and apparatus costs noted above is obviously highly desired and of special significance in the manufacture of a relatively low cost commodity such as dry skim milk.

The principal object of the present invention is to provide an improved low cost process for converting liquid concentrates containing solid materials into readily wettable and dispersible solid porous aggregates or agglomerates.

Another principal object of the present invention is to provide a process for converting liquid skim milk concentrates to readily wettable and dispersible loose porous aggregates or agglomerates without any substantial increase in cost over that involved in the manufacture of conventional skim milk powder.

Another object of the present invention is to provide a process for producing porous aggregates or agglomerates from liquid concentrates that can be carried out at low cost and completed in one operation in the same apparatus.

Another object of the present invention is to provide a process for directly converting a liquid skim milk concentrate to porous aggregates or agglomerates, i.e. a low cost process which does not require additional steps involving the treatment of conventional skim milk powder and the special apparatus required to carry out such steps.

Other objects of the invention will be apparent from the detailed description below.

Referring to the drawing:

FIGURE 1 is a schematic vertical sectional view through a spray drying tower showing the invention as applied thereto. Except for the arrangement of the spray or atomizing heads, the tower is of the conventional type employed in the manufacture of conventional spray dried skim milk powder.

FIGURE 2 is a detailed sectional view of the upper portion of the spray drying tower shown in FIGURE 1.

FIGURE 3 is a horizontal sectional view taken along line 3—3 of FIGURE 2 showing the distribution of the spray or atomizing heads.

In investigations in this field in attempts to solve the "cost" problem noted above, we discovered a method of converting a liquid concentrate having solid material dissolved or dispersed therein into readily wettable porous aggregates or agglomerates of said solid material, which comprises forming in an enclosure a stream of relatively dry particles of the solid material by spraying or atomizing a portion of the liquid concentrate into heated gas in said enclosure, forming a stream of relatively wet particles of solid material by spraying or atomizing another portion of the liquid concentrate in said enclosure, forming aggregates or agglomerates of the solid material by contacting the dry particles with the wet particles, e.g. by spraying or atomizing a portion of the liquid concentrate into the stream of dry particles, and then reducing the moisture of the resulting moist aggregates or agglomerates by allowing the particles of solid material in aggregate or agglomerate form to continue falling downwardly by gravity in said heated gas in said enclosure. This method, which does not require special apparatus of the type described in the above referred to Peebles and Louder et al. patents, can be readily carried out with the proper arrangement of spray or atomizing heads in a single operation in a single spray drying chamber or enclosure of the conventional type used in the manufacture of conventional skim milk powder such as illustrated in the drawing.

One of the preferred arrangements of the spray or atomizing nozzles or heads is made up of four upper nozzles or heads, at the same level, spaced an equal distance apart from each other and around the central conduit leading to the lower or central nozzle or head. This is the arrangement illustrated in the drawings in which 10 represents the tower or enclosure with more or less conventional heated gas inlets 11 and 11', baffle wall 12, perforated plates 13 and 13', bottom section 14 and cyclone separator 15 with gas outlet 16. The hot gases entering inlets 11 and 11' pass downwardly through perforated plates 13 and 13', respectively, to the area into which the liquid concentrate is being sprayed or atomized and on to bottom section 14, cyclone separator 15 and outlet 16 as indicated in detail below.

The concentrate is introduced into the tower or enclosure by conduit 30 where a portion (see FIGURE 2) passes by way of conduits 31 and 32 to spray or atomizing head 33, a similar portion by way of conduits 31' and 32' to spray or atomizing head 33', and similar portions (see FIGURE 3) by way of conduits 31" and 31'" and conduits 32″ and 32‴ (not shown), respectively, to spray or atomizing heads 33″ and 33‴. The remaining portion of the liquid concentrate passes by way of conduit 34 to spray or atomizing head 35. Upper nozzles or heads 33, 33′, 33″ and 33‴, are preferably of the type that direct the liquid concentrate generally downwardly to provide relatively compact falling streams with the drying particles positioned relatively closely adjacent to one another. Lower nozzle or head 35 is of the type which fans out or directs the liquid concentrate generally outwardly to provide streams of relatively wet particles which impinge on the streams of falling relatively dry particles coming from the upper nozzles. With this arrangement and to provide for proper contact between the relatively wet particles coming from the lower or central nozzle or head, with the relatively dry particles falling from the upper nozzles or heads, the lower or central nozzle or head (35) can advantageously be of the conventional centrifugal atomizer type illustrated in Peebles et al. Patent 2,088,606.

The liquid concentrate, e.g. skim milk at 50–165° F. and containing about 30–50% by weight of total solids, leaving the upper spray or atomizing heads, illustrated by 33 and 33′ in FIGURE 2, is initially released in the form of finely divided atomized wet droplets as indicated at 36. These droplets dry rapidly in the presence of the hot gas, e.g. air at a temperature of 325–550° F., introduced into the tower at inlets 11 and 11′, and are substantially in relatively dry solid particle form as indicated at 37. At this point the falling relatively dry particles come in contact with the drying liquid concentrate in relatively wet droplet or particle form 38 released from lower spray or atomizing head 35. As the relatively wet particles impinge upon the relatively dry particles, the wet particles lose moisture and dry particles, particularly the surfaces thereof, become moist. These contacts between the particles as well as other contacts resulting from the movements of the particles due to turbulence set up by contact of the atomized streams, causes particles to permanently adhere together and build up into moist aggregates or agglomerates as indicated at 39. Excess moisture is then removed by the hot gases as the moist aggregates or agglomerates continue to fall by gravity concurrently with the hot gas to the bottom section 14 of tower 10 where the substantially dry porous aggregates or agglomerates, e.g. skim milk containing about 94—98% solids, settle and can be removed by way of outlet 17 by conventional procedures. The gas with any fines that may be present in the gas stream leaves bottom section 14 by way of conduits 18 and 18′ and passes by way of conduit 19 to cyclone separator 15, where the fines can be separated and recovered as indicated at 20 in accordance with conventional procedures. The gas, free from fines, leaves by outlet 16 as previously indicated.

The following example will serve to further illustrate the method of the present invention.

*Example*

Milk fat is separated from whole milk and the resulting skim milk then pasteurized, forewarmed and concentrated under vacuum to 42–45% total solids in accordance with known procedures employed in the manufacture of conventional spray dried skim milk powder. The skim milk concentrate, cooled to a temperature of about 50° F., or warmed up to 125° F., is then pumped in accordance with conventional procedure under high pressure to a spray drying tower or enclosure with four upper atomizing heads and one lower or central atomizing head of the type illustrated in the drawing. The upper atomizing heads are at the same level and are positioned outwardly about 9 inches from conduit 34 leading to the lower or central atomizing head 35 which is positioned downwardly about six inches below the upper atomizing heads. The inlet air temperature is at about 350° F. and the air is introduced in sufficient amounts to maintain the outlet air temperature at about 160–225° F. The droplets 36 of the skim milk concentrate released from the upper nozzles 33, 33′, etc. fall by gravity and dry rapidly in the hot air and are in relatively dry particle form at 37 where they contact the relatively wet particles 38 of atomized concentrate released from the lower nozzle 35. In addition to these more or less direct contacts between the particles various other particle contacts occur due to agitation of the particles at the points of contact of the atomized streams. As a result of these contacts, in which there is a transfer of moisture from the wet particles to the dry particles, the particles adhere and build up to moist aggregates or agglomerates 39. The desired porous aggregates or agglomerates are obtained, as indicated above, by removal of excess water as the moist aggregated or agglomerated particles continue to fall by gravity in the hot air to the bottom of the tower or enclosure. The resulting loose porous product contains about 2–5% moisture and is readily wettable by and dispersible in water to form a stable homogeneous liquid milk product.

The skim milk aggregated or agglomerated products produced by the process of the present invention achieve the same degree of wettability and dispersibility as the products produced by the Peebles and Louder et al. processes and yet have been found to retain greater bulk density than the Peebles and Louder et al. products. This also allows for savings in packaging costs in addition to the savings in labor and apparatus costs noted above. As the danger of contamination increases with rehandling of products as called for in the Peebles and Louder et al. processes, the process of the present invention for sanitary reasons has the additional advantage in that it keeps danger of contamination to the minimum.

While the apparatus illustrated in the drawing contains four upper spray or atomizing nozzles or heads it will be understood that more, e.g. 5–10, or less, e.g. 1–3, atomizing nozzles or heads can be used. The same applies to the lower atomizing head. All that is necessary to form the desired porous aggregates or agglomerates is for the arrangement of atomizing nozzles or heads to be such that substantially all of the atomized relatively wet particles of liquid concentrate will impinge on or contact substantially all of the atomized relatively dry particles of liquid concentrate. To most readily accomplish this objective, the use of a multiple (3 or more) of upper atomizing head uniformly positioned around a lower atomizing head is preferred. For optimum results the distances between the upper and lower atomizing heads will vary depending on the inlet and outlet gas temperatures, the temperature of the liquid concentrate, the total solids in the liquid concentrate, the make up of the solid material as well as the solvent, the nozzles or heads employed, etc., but can be readily ascertained by preliminary test. Also, while the invention has been described with particular reference to skim milk, it will be understood that the process can be employed advantageously in the preparation of readily wettable porous aggregates or agglomerates of whole milk, cocoa, coffee and the like. The process can also be employed in the preparation of porous aggregates or agglomerates of various chemicals using volatile solvents, e.g. organic solvents, other than water.

We claim:

A method of converting liquid concentrated skim milk containing about 30–50% by weight of total solids into water wettable and readily dispersible coarse agglomerates of loose porous structure containing about 94–98% by weight of total solids, which comprises producing in an enclosure four atomized streams of relatively dry milk powder, the particles of which fall downwardly in relatively compact streams, by separately atomizing generally downwardly and spaced an equal distance apart from each other, four portions of the liquid concentrated skim milk into heated air in said enclosure, contacting the relatively dry milk particles with particles in an atomized stream of relatively wet milk particles, by atomizing generally outwardly another portion of the liquid concentrated skim milk into the streams of falling relatively dry particles uniformly positioned around said stream of relatively wet particles, and then reducing the moisture of the resulting moist agglomerates by allowing the agglomerates to continue falling downwardly by gravity in said heated air in said enclosure.

References Cited in the file of this patent

UNITED STATES PATENTS

| | | |
|---|---|---|
| 718,191 | Campbell | Jan. 13, 1903 |
| 1,808,730 | Bornegg | June 2, 1931 |
| 2,832,686 | Louder et al. | Apr. 29, 1958 |
| 2,835,597 | Barzelay | May 20, 1958 |
| 2,911,300 | Peebles | Nov. 3, 1959 |